(12) United States Patent
Miyashita

(10) Patent No.: US 9,228,538 B2
(45) Date of Patent: Jan. 5, 2016

(54) INTERNAL COMBUSTION ENGINE CONTROL APPARATUS

(75) Inventor: Shigeki Miyashita, Susono (JP)

(73) Assignee: TOYOTA JIDOSHA KABUSHIKI KAISHA, Aichi-ken (JP)

(*) Notice: Subject to any disclaimer, the term of this patent is extended or adjusted under 35 U.S.C. 154(b) by 4 days.

(21) Appl. No.: 14/004,069

(22) PCT Filed: May 19, 2011

(86) PCT No.: PCT/JP2011/061508
§ 371 (c)(1),
(2), (4) Date: Sep. 9, 2013

(87) PCT Pub. No.: WO2012/157108
PCT Pub. Date: Nov. 22, 2012

(65) Prior Publication Data
US 2014/0060043 A1    Mar. 6, 2014

(51) Int. Cl.
 *F02B 33/44* (2006.01)
 *F02M 25/07* (2006.01)
 *F02D 41/00* (2006.01)
 *F02B 29/04* (2006.01)
 *F02D 41/14* (2006.01)

(52) U.S. Cl.
 CPC ........ *F02M 25/0712* (2013.01); *F02D 41/0052* (2013.01); *F02D 41/0062* (2013.01); *F02D 41/0072* (2013.01); *F02M 25/0713* (2013.01); *F02B 29/0406* (2013.01); *F02D 2041/1418* (2013.01); *F02M 25/0707* (2013.01); *F02M 25/0727* (2013.01); *F02M 25/0752* (2013.01); *Y02T 10/47* (2013.01)

(58) Field of Classification Search
 CPC .......... F02M 25/0718; F02M 25/0707; F02M 25/0704; Y02T 10/121; Y02T 10/47; F02D 41/0007; F02D 41/0065; F02B 47/08

USPC .................... 60/602, 605.2, 285; 123/568.14, 123/568.19, 568.21; 701/102, 108
 See application file for complete search history.

(56) References Cited

U.S. PATENT DOCUMENTS

| | | | |
|---|---|---|---|
| 2010/0050634 A1* | 3/2010 | Yager | 60/605.2 |
| 2011/0072796 A1* | 3/2011 | Van Nieuwstadt | 60/285 |
| 2011/0146268 A1* | 6/2011 | Hepburn et al. | 60/602 |

FOREIGN PATENT DOCUMENTS

| | | |
|---|---|---|
| DE | 10107160 A1 | 8/2001 |
| EP | 2317106 A1 | 5/2011 |
| JP | 2000-110628 A | 4/2000 |

(Continued)

OTHER PUBLICATIONS

International Search Report of PCT/JP2011/061508 dated Jul. 26, 2011.

*Primary Examiner* — Jesse Bogue
*Assistant Examiner* — Thomas Olszewski
(74) *Attorney, Agent, or Firm* — Sughrue Mion, PLLC

(57) ABSTRACT

An object of the invention is to provide an internal combustion engine control apparatus that can restrain an EGR amount from becoming excessive, and restrain destabilization of combustion. . . . First, in response to a change of an operation condition, operation amounts of a plurality of actuators that influence the EGR amount are set. When the operation amounts of the plurality of actuators are set, operation of an actuator that decreases the EGR amount (referring to an external EGR amount, an internal EGR amount or both, the same applying to the following) is started (S140), and thereafter, operation of another actuator that increases the EGR amount is started (S150).

2 Claims, 4 Drawing Sheets

(56) References Cited

FOREIGN PATENT DOCUMENTS

| | | |
|---|---|---|
| JP | 2001-020793 A | 1/2001 |
| JP | 2003-021001 | 1/2003 |
| JP | 2010-138734 A | 6/2010 |
| JP | 2011-069333 A | 4/2011 |

* cited by examiner

| ACTUATORS | | INFLUENCE ON EGR AMOUNT | | OPERATION SPEED |
|---|---|---|---|---|
| (a) EGR VALVE | OPENING INCREASE | → | EGR AMOUNT INCREASE | LOWER |
| | OPENING DECREASE | → | EGR AMOUNT DECREASE | |
| (b) WGV | OPENING DECREASE | → | EGR AMOUNT INCREASE | INFLUENCE BY VALVE OPENING IS QUICK |
| | OPENING INCREASE | → | EGR AMOUNT DECREASE | INFLUENCE BY VALVE CLOSING IS SLOW |
| (c) INTAKE VVT | ADVANCE | → | EGR AMOUNT DECREASE | SPEED CHANGES WITH OIL PRESSURE |
| | DELAY | → | EGR AMOUNT DECREASE | |
| | INTERMEDIATE POSITION | → | EGR AMOUNT INCREASE | |
| (d) EXHAUST VVT | ADVANCE | → | EGR AMOUNT DECREASE | SPEED CHANGES WITH OIL PRESSURE |
| | DELAY | → | EGR AMOUNT DECREASE | |
| | INTERMEDIATE POSITION | → | EGR AMOUNT INCREASE | |
| (e) INTAKE VALVE | OPERATION ANGLE INCREASE | → | EGR AMOUNT INCREASE | HIGHER |
| | OPERATION ANGLE DECREASE | → | EGR AMOUNT DECREASE | |
| (f) THROTTLE VALVE | OPENING DECREASE | → | EGR AMOUNT INCREASE | HIGHER |
| | OPENING INCREASE | → | EGR AMOUNT DECREASE | |

Figure 3

S100··· CHANGE IN OPERATION CONDITIONS
S110··· ESTIMATE PROCESS OF CHANGE IN EGR AMOUNT
S120··· EGR AMOUNT > ALLOWABLE VALUE
S130··· OPERATE ACTUATOR WITH INFLUENCE IN DECREASING EGR AMOUNT
S140··· ACTUATOR WITH INFLUENCE IN DECREASING EGR AMOUNT
S150··· OPERATE ALL ACTUATORS

INTERNAL COMBUSTION ENGINE CONTROL APPARATUS

CROSS REFERENCE TO RELATED APPLICATIONS

This is a National Stage of International Application No. PCT/JP2011/061508 filed May 19, 2011, the content of all of which is incorporated herein by reference in its entirety.

TECHNICAL FIELD

The present invention relates to an internal combustion engine control apparatus, and more particularly, relates to an internal combustion engine control apparatus that is suitable for executing control of the internal combustion engine that is loaded on a vehicle.

BACKGROUND ART

There has been conventionally known an internal combustion engine equipped with a supercharger and an exhaust gas recirculation system (hereinafter, simply called an EGR (Exhaust Gas Recirculation) system), as is disclosed in, for example, Patent Literature 1 (Japanese Patent Laid-Open No. 2000-110628). Further, the following publications disclose an internal combustion engine control apparatus that control an EGR valve based on an intake air amount and a supercharging efficiency.

CITATION LIST

Patent Literature

Patent Literature 1: Japanese Patent Laid-Open No. 2000-110628
Patent Literature 2: Japanese Patent Laid-Open No. 2001-020793

SUMMARY OF INVENTION

Technical Problem

In the above-described internal combustion engine, the operation amounts of a plurality of actuators are set to satisfy a target EGR amount (EGR rate) corresponding to the operation conditions. However, responsiveness to a change of the EGR amount varies from one actuator to another. Therefore, when EGR amount increasing control by the actuator with high responsiveness and EGR amount decreasing control by the actuator with low responsiveness are simultaneously performed, the EGR amount temporarily becomes higher than a target EGR amount (overshooting). If the EGR amount temporarily becomes excessive, combustion becomes unstable, which becomes a cause of occurrence of a misfire or the like.

The invention is made to solve the problem as described above, and an object of the invention is to provide an internal combustion engine control apparatus that can restrain an EGR amount from becoming excessive, and restrain destabilization of combustion.

Solution to Problem

A first invention is an internal combustion engine control apparatus, the internal combustion engine control apparatus comprising:

setting means that sets operation amounts of a plurality of actuators that influence an EGR amount, in response to a change of an operation condition; and actuator sequentially controlling means that, when the operation amounts of the plurality of actuators are set, starts operation of an actuator that decreases the EGR amount (referring to an external EGR amount, an internal EGR amount or both, the same applying to the following), and thereafter, starts operation of another actuator that increases the EGR amount.

A second invention is the internal combustion engine control apparatus according to the first invention, wherein when the operation amounts of the plurality of actuators are set, the actuator sequentially controlling means completes the operation of the actuator that decreases the EGR amount, and thereafter, starts the operation of the other actuator that increases the EGR amount.

A third invention is the internal combustion engine control apparatus according to the second invention, further comprising:

estimating means that estimates a change process of the EGR amount in a case in which operation of the plurality of actuators is simultaneously started, in accordance with the set operation amounts of the plurality of actuators;

determining means in which a determination condition is established when the EGR amount becomes larger than an allowable value in the change process; and actuator simultaneously controlling means that simultaneously starts the operation of the plurality of actuators when the determination condition is not established, wherein when the determination condition is established, the actuator sequentially controlling means completes the operation of the actuator that decreases the EGR amount, and thereafter, starts the operation of the other actuator that increases the EGR amount.

A fourth invention is the internal combustion engine control apparatus according to any one of the first to third inventions, wherein the plurality of actuators include at least a waste gate valve that can optionally open and close a bypass passage that bypasses an upstream side and a downstream side of a supercharger that is disposed in an exhaust passage of the internal combustion engine, an EGR valve that can optionally open and close an EGR passage that connects the exhaust passage provided upstream of the supercharger, and an intake passage of the internal combustion engine, and a throttle that can optionally open and close the intake passage.

Advantageous Effects of Invention

According to the first invention, when the operation amounts of the plurality of actuators are set, the operation of an actuator that decreases the EGR amount is started, and thereafter, the operation of another actuator that increases the EGR amount is started. Therefore, according to the present invention, the EGR amount is restrained from becoming excessive, and further destabilization of combustion can be restrained.

According to the second invention, when the operation amounts of the plurality of actuators are set, the operation of the actuator that decreases the EGR amount is completed, and thereafter, the operation of the other actuator that increases the EGR amount is started. Therefore, according to the present invention, the EGR amount does not become excessive, and the EGR amount can be controlled to a target EGR amount.

According to the third invention, when the EGR amount in the change process is the allowable value or less, the operation of the plurality of actuators is simultaneously started. Therefore, the EGR amount does not become excessive, and the EGR amount can be controlled to a target EGR amount at an early stage. Further, when the EGR amount in the change process is larger than the allowable value, the operation of the actuator that decreases the EGR amount is completed, and thereafter, the operation of the actuator that increases the EGR amount is started. Therefore, the EGR amount is restrained from becoming excessive, and further destabilization of combustion can be restrained. Therefore, according to the present invention, controllability of the EGR amount and combustion stability can be made compatible.

According to the fourth invention, the waste gate valve, the EGR valve and the throttle can be cooperatively controlled.

BRIEF DESCRIPTION OF DRAWINGS

FIG. 3 is a diagram for explaining operation speeds of various actuators and influences on the EGR amount by the operation.

DESCRIPTION OF EMBODIMENT

Hereinafter, an embodiment of the present invention will be described in detail with reference to the drawings. Note that common elements in the respective drawings are assigned with the same reference signs, and the redundant description will be omitted.

Embodiment 1

System Configuration of Embodiment 1

Figure 1:
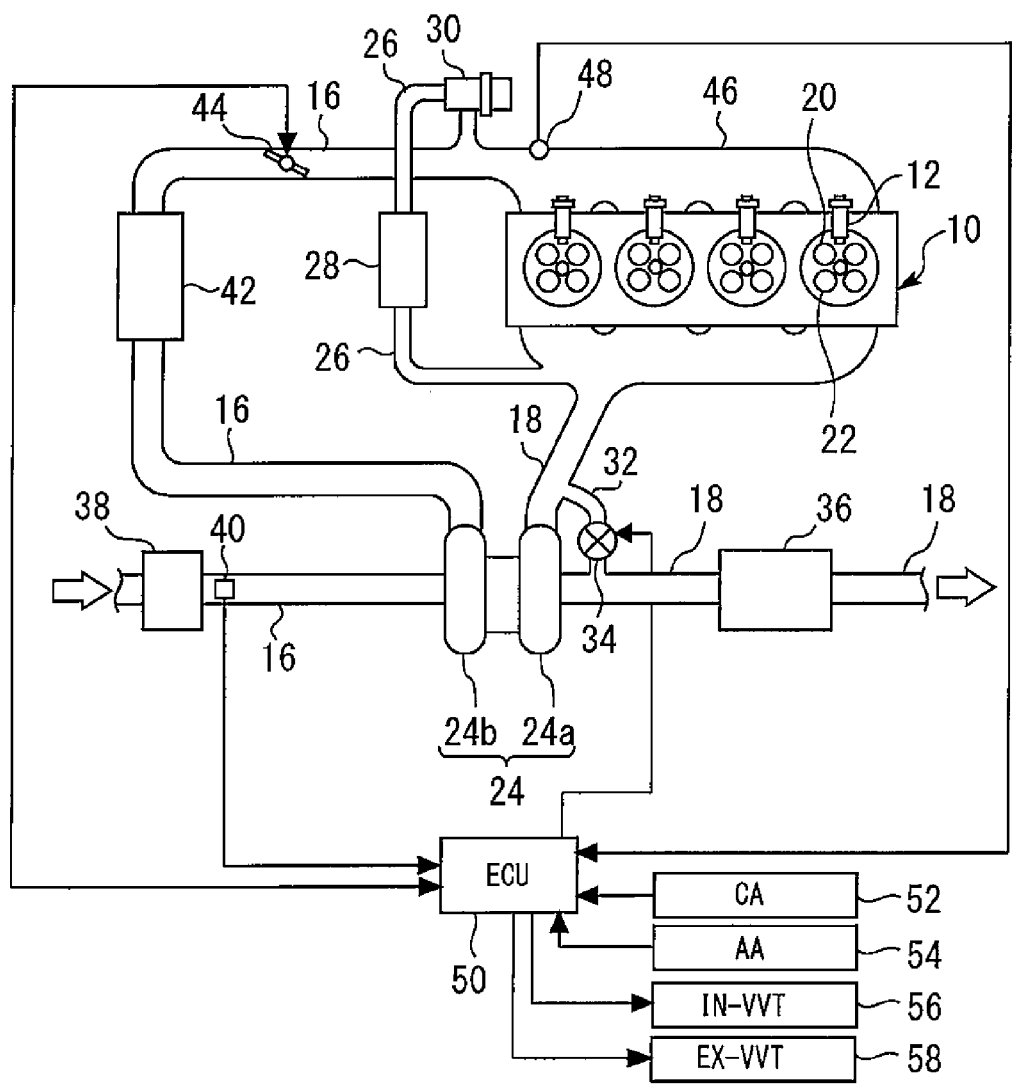
FIG. 1 is a diagram for explaining a system configuration of Embodiment 1 of the present invention.

FIG. 1 is a diagram for explaining a system configuration of Embodiment 1 of the present invention. A system shown in FIG. 1 includes an internal combustion engine 10. The internal combustion engine 10 is a four-cycle engine that is loaded on a vehicle or the like, and is used as a power source thereof. The internal combustion engine 10 shown in FIG. 1 is of an inline four-cylinder type, but in the present invention, the number of cylinders and a disposition of the cylinders are not limited to this.

Each of the cylinders of the internal combustion engine 10 is provided with an injector 12 that directly injects fuel into the cylinder. Note that the present invention is similarly applicable to a port injection-type internal combustion engine which includes a port injector that port-injects fuel into an intake port, and an internal combustion engine using the injector 12 and a port injector in combination, without being limited to a cylinder injection-type internal combustion engine as above.

An intake passage 16 and an exhaust passage 18 are connected to each of the cylinders of the internal combustion engine 10. An intake valve 20 that provides and shuts off communication between the inside of the cylinder and the intake passage 16 is provided at a downstream end of the intake passage 16. Similarly, an exhaust valve 22 that provides and shuts off communication between the inside of the cylinder and the exhaust passage 18 is provided at an upstream end of the exhaust passage 18.

An exhaust gas that is discharged from each of the cylinders of the internal combustion engine 10 flows into the exhaust passage 18. The internal combustion engine 10 includes a turbo charger 24 that performs supercharging by energy of the exhaust gas. The turbo charger 24 has a turbine 24a that rotates by the energy of the exhaust gas, and a compressor 24b that is rotated by being driven by the turbine 24a. The turbine 24a is disposed halfway in the exhaust passage 18, and the compressor 24b is provided halfway in the intake passage 16.

The exhaust passage 18 provided upstream of the turbine 24a is connected to the intake passage 16 by an external EGR passage 26. Halfway in the external EGR passage, an EGR cooler 28 is provided. An electronically controlled-type EGR valve 30 that can optionally open and close the external EGR passage 26 is provided downstream of the EGR cooler 28.

A bypass passage 32 that connects the exhaust passage 18 in a vicinity of an inlet of the turbine 24a, and the exhaust passage 18 in a vicinity of an outlet of the turbine 24a are provided near the turbine 24a. The bypass passage 32 is provided with an electronically controlled-type waste gate valve (hereinafter, called a WGV (Waste Gate Valve)) 34 that can optionally open and close the bypass passage 32.

The exhaust passage 18 provided downstream of the turbine 24a is provided with a catalyst 36 that purifies harmful components in the exhaust gas. For the catalyst 36, for example, a three-way catalyst or the like is used.

An air cleaner 38 is provided in the vicinity of the inlet of the intake passage 16. Further, an airflow meter 40 that detects an intake air amount is provided near a downstream side of the air cleaner 38. The compressor 24b is provided downstream of the airflow meter 40. An intercooler 42 is provided downstream of the compressor 24b.

Fresh air that is taken in through the air cleaner 38 is compressed in the compressor 24b of the turbo charger 24, and thereafter, is cooled in the intercooler 42. An electronically controlled-type throttle valve 44 is provided downstream of the intercooler 42. The fresh air that passes through the throttle valve 44 is caused to flow into a surge tank 46 that is formed at a downstream portion of the intake passage 16. The fresh air that is caused to flow into the surge tank 46 is caused to flow into the respective cylinders by being distributed. The surge tank 46 is provided with an intake air pressure sensor 48 that detects an intake air pressure at a region thereof.

The system of the present embodiment further includes an ECU (Electronic Control Unit) 50. Various sensors for detecting an operating state of the internal combustion engine 10, such as a crank angle sensor 52 that detects a crank angle and an accelerator opening sensor 54 that detects a value corresponding to a depressing amount of an accelerator that is operated by a driver, in addition to the airflow meter 40 and the intake pressure sensor 48, which are described above are connected to an input section of the ECU 50.

Further, various actuators for controlling the operating state of the internal combustion engine 10, such as a variable valve device (hereinafter, called an intake VVT) 56 that can change valve timing and a lift amount of the intake valve 20, and a variable valve device (hereinafter, called an exhaust VVT) 58 that can change valve timing of the exhaust valve 22, in addition to the injector 12, the EGR valve 30, the WGV 34 and the throttle valve 44, which are described above are connected to an output section of the ECU 50. For the intake VVT 56 and the exhaust VVT 58, known mechanisms that are capable of changing valve timing and lift amounts by hydraulic pressure are used. The ECU 50 controls the operating state of the internal combustion engine 10 by actuating the various actuators in accordance with a predetermined program, based on the outputs of the various sensors, which are described above.

The ECU 50 calculates a target EGR amount (the amount of the exhaust gas to be introduced into the intake passage 16 via the external EGR passage 26, which is to be the amount of the exhaust gas to be supplied into the combustion chamber) in response to operation conditions. The target EGR amount is calculated based on, for example, an engine speed and a load rate. Further, the ECU 50 calculates operation amounts of the various actuators described above in order to realize the target EGR amount. Incidentally, in the various actuators, which are described above, the effects exerted on the operation speed and the EGR amount vary from one actuator to another. Therefore, when EGR amount increasing control by an actuator with a high operation speed, and EGR amount decreasing control by an actuator with a low operation speed are simultaneously performed, the EGR amount temporarily becomes excessive (overshooting). If the EGR amount temporarily becomes excessive, combustion becomes unstable, which becomes a cause of occurrence of a misfire or the like.

Figure 2:
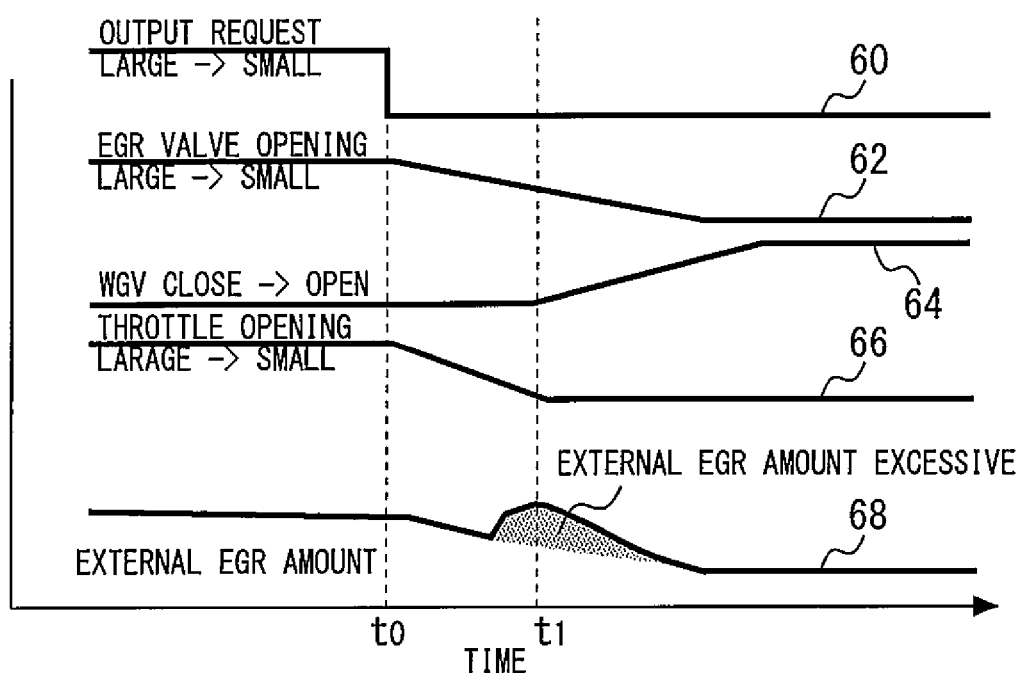
FIG. 2 is a diagram showing a change of the EGR amount in the case where a plurality of actuators are operated, in response to operation conditions.

A specific example will be described with use of FIG. 2. FIG. 2 is a diagram showing a change of the EGR amount in the case where a plurality of actuators are operated, in response to operation conditions. A solid line 60 represents an output request, a solid line 62 represents an opening of the EGR valve 30, a solid line 64 represents an opening of the WGV 34, a solid line 66 represents an opening of the throttle valve 44, and a solid line 68 represents an external EGR amount, respectively.

When the operation condition changes from the operation condition with a large output request to the operation condition with a small output request as shown by the solid line 60 at time $t_0$, the operating state changes from a steady state operation to a transient operation. The ECU 50 calculates a target EGR amount in response to the change of the operation condition, and determines control amounts of various actuators which satisfy the target amount. In the example shown in FIG. 2, the EGR valve 30 is controlled in a direction in which the opening decreases (solid line 62), the WGV 34 is controlled from a closed state to an opened state (solid line 64), and the throttle valve 44 is controlled in the direction in which the opening decreases (solid line 66). Here, the control for the EGR valve 30 and the WGV 34 is the control that decreases the EGR amount. The control for the throttle valve 44 is the control that increases the EGR amount.

In general, the operation speed of the throttle valve 44 is higher than the operation speeds of the EGR valve 30 and the WGV 34. Therefore, the operation of the throttle valve 44 is completed at time $t_1$, but the operations of the EGR valve 30 and the WGV 34 are not completed. Therefore, as shown by the solid line 68, the external EGR amount temporarily becomes excessive in some cases. If the EGR amount becomes excessive, combustion stability is impaired. In order to solve the problem like this, the respective actuators are desirably operated so that the external EGR amount at the time of a transient operation becomes smaller than the external EGR amount at the time of a steady state operation.

Characteristic Control in Embodiment 1

Consequently, in the system of the present embodiment, the operation sequence of the actuator with a low operation speed, which is controlled in the direction in which the EGR amount decreases, is performed earlier, and the operation sequence of the actuator with a high operation speed, which is controlled in the direction in which the EGR amount increases, is performed later.

(Operation Speeds of Various Actuators and Influences on the EGR Amount by Operation)

On setting the operation sequences of the various actuators, operation speeds of the various actuators and influences on the EGR amount by the operation will be described with use of FIG. 3. (a) The EGR valve 30 has a lower operation speed as compared with the throttle valve 44, the WGV 34 and the like. Further, as the valve opening increases more, the EGR amount increases more, and as the valve opening decreases more, the EGR amount decreases more. (b) In the WGV 34, an influence on the EGR amount by valve opening is quick, and an influence on the EGR amount by valve closing is slow. Further, as the valve opening decreases more, the EGR amount increases more, and as the valve opening increases more, the EGR amount decreases more. (c) The operation speed of the intake VVT 56 varies in accordance with hydraulic pressure. Further, as the valve timing of the intake valve 20 is shifted closer to an intermediate position (reference position), the EGR amount increases more, and as the valve timing of the intake valve 20 is advanced or delayed more from the intermediate position, the EGR amount decreases more. (d) The operation speed of the exhaust VVT 58 varies in accordance with hydraulic pressure. Further, as the valve timing of the exhaust valve 22 is shifted closer to the intermediate position (reference position), the EGR amount increases more, and as the valve timing of the exhaust valve 22 is advanced or delayed more from the intermediate position, the EGR amount decreases more. (e) An operation speed of an operation angle of the intake valve 20 is higher as compared with that of the EGR valve 30 or the like. Further, as the operation angle increases more, the EGR amount increases more, and as the operation angle decreases more, the EGR amount decreases more. (f) An operation speed of the throttle valve 44 is higher as compared with those of the EGR valve 30, the WGV 34 and the like. Further, as the valve opening decreases more, the EGR amount increases more, and as the valve opening increases more, the EGR amount decreases more.

Based on the characteristics of the actuators as above, the order of precedence is set in the ECU 50 in advance so that the operation sequences of the actuators with low operation speeds, which are controlled in the direction in which the EGR amount decreases, can precede the operation sequences of the actuators with high operation speeds, which are controlled in the direction in which the EGR amount increases.

Incidentally, the operation limitation of the actuators as described above is not necessary when the EGR amount does not overshoot. Therefore, the operation limitation is desirably executed only when the EGR amount is estimated to overshoot when a plurality of actuators are simultaneously operated. Therefore, in the system of the present embodiment, a change process of the EGR amount corresponding to a change of the operation conditions is estimated, and when a transient EGR amount change cannot be allowed, limitation is placed on the operation of the actuator that increases the EGR amount.

(Estimation Method of the Change Process of the EGR Amount)

Here, an estimation method of the change process of the EGR amount will be described. The change process of the EGR amount can be estimated from an EGR gas flow rate in each time point during a transient operation. The EGR gas flow rate can be calculated based on Equation (1). In Equation (1), $G_{egr}$ refers to a correlation value of the EGR gas flow rate, ΔP refers to a fore-and-aft differential pressure of the EGR valve 30, and $S_{egr}$ refers to a passage area of the EGR valve 30.

$$G_{egr} = \Delta P \times S_{egr} \quad (1)$$

The fore-and-aft differential pressure ΔP of the EGR valve 30 can be expressed by a difference of a back pressure (exhaust pressure upstream of the turbine 24a) $P_{ex}$ and an intake pressure $P_{in}$. Therefore, the correlation value $G_{egr}$ of the EGR gas flow rate can be calculated based on Equation (2).

$$G_{egr} = (P_{ex} - P_{in}) \times S_{egr} \quad (2)$$

The back pressure $P_{ex}$ of Equation (2) is a back pressure at a time without external EGR, and is acquired from a map that is stored in advance. More specifically, in the ECU 50, the map in which a relation of the engine speed, a load rate and the back pressure $P_{ex}$ are set for each of the opening and the closing conditions of the WGV 34 is stored in advance. The engine speed is calculated from the detection value obtained by the crank angle sensor 52. The load rate is calculated based on, for example, the intake air amount, the intake air pressure and the like. The ECU 50 acquires the back pressure $P_{ex}$ from the map with the opening and the closing conditions of the WGV 34, the engine speed, and the load rate as the input parameters.

Further, the intake pressure $P_{in}$ of Equation (2) is an intake pressure at a time without the external EGR, and is acquired from a map that is stored in advance. More specifically, in the ECU 50, the map in which a relation of the engine speed, the load rate and the intake pressure $P_{in}$ are set for each combination of an angle of the intake VVT 56 and an angle of the exhaust VVT 58 is stored in advance. The ECU 50 acquires the intake pressure $P_{in}$ from the map with the angle (angle that is advanced or delayed from a central position) of the intake VVT 56, the angle (angle that is advanced or delayed from the central position) of the exhaust VVT 58, the engine speed, and the load rate as the input parameters.

Furthermore, the passage area $S_{egr}$ of the EGR valve 30 in Equation (2) can be calculated based on Equation (3). $S_{egr}$ is a correlation value of the passage area of the EGR valve 30, which is correlated to the EGR valve opening. The openings at each time point of the WGV 34, the throttle valve 44 and the like are similarly calculated from a present position and the operation speeds of the respective actuators, and are set as the input parameters of the above-described map.

$$S_{egr} = \text{present opening} + \text{time period} \times \text{EGR valve operation speed} \quad (3)$$

From the above, based on Equation (2), the correlation value $G_{egr}$ of the EGR gas flow rate at each time point until the EGR amount changes to a target EGR amount from the present EGR amount can be calculated. In this manner, the change process of a later EGR amount can be estimated. When the correlation value $G_{egr}$ of the EGR gas flow rate exceeds an allowable value (for example, the EGR amount in a steady state operation before the transient operation) in the change process of the EGR amount, it can be determined that the transient EGR amount change cannot be allowed.

Therefore, in the system of the present embodiment, the change process of the EGR amount at the time of the transient operation is estimated based on Equation (2), and when the EGR amount in the change process is estimated to exceed the allowable value, an actuator that decreases the EGR amount are operated first. Meanwhile, when it is predicted that the EGR amount does not exceed the allowable value, the respective actuators are simultaneously operated.

(Control Routine)

Figure 4:
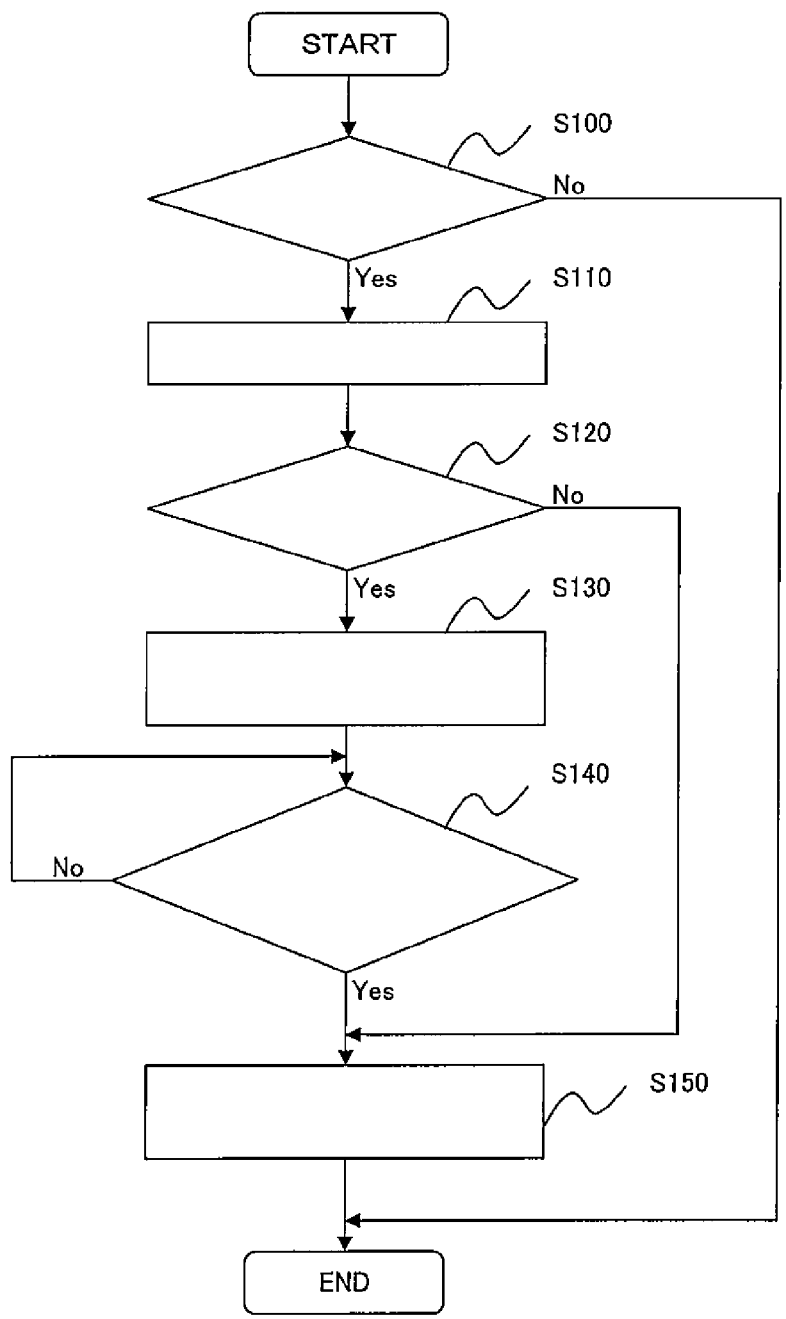
FIG. 4 is a flowchart of a control routine that the ECU 50 executes, according to Embodiment 1 of the present invention.

FIG. 4 is a flowchart of a control routine that the ECU 50 executes, in order to realize the above-described operation. In the routine shown in FIG. 4, it is firstly determined whether or not there is a change in the operation conditions in step S100. When the steady state operation continues, the processing of the present routine is ended.

Meanwhile, when it is determined that there is a change in the operation conditions, next, the change process of the EGR amount until the EGR amount changes from the present EGR amount to a target EGR amount is estimated (step S110). Note that the target EGR amount is set in response to the operation conditions, and the change process of the EGR amount is estimated by the above-described estimation method.

Next, it is determined whether or not the EGR amount becomes larger than the allowable value in the change process of the EGR amount (step S120). As the allowable value, the value that is a larger value than the EGR amount in the steady state operation before the transient operation, and that is larger than the target EGR amount is set. When it is determined that the EGR amount in the change process is the allowable value or less, the processing of the present routine is ended. Thereafter, in another routine, the operations of a plurality of actuators with the operation amounts being set in accordance with the operation conditions are simultaneously started.

Meanwhile, when it is determined that the EGR amount in the change process is larger than the allowable value, the actuators that have influence on decrease in the EGR amount are operated (step S130). As described above, the ECU 50 stores in advance the order of precedence concerning the operations of the actuators, and operates actuators with earlier orders of precedence first.

Next, it is determined whether or not the actuators that have the influence on decrease in the EGR amount are already operated (step S140). When they are not already operated, the ECU 50 waits until it confirms completion of the operation.

When it is determined that the actuators that have the influence on decrease in the EGR amount are already operated in step S140, all the other actuators are operated (step S150). Thereafter, the processing of the present routine is ended.

As described above, according to the routine shown in FIG. 4, the change process of the EGR amount at the time of the transient operation is estimated, and when it is predicted that the EGR amount in the change process exceeds the allowable value, the actuators that have the influence on decrease in the EGR amount are operated first. Therefore, the EGR amount is restrained from becoming excessive, and destabilization of the combustion due to excessively increased EGR amount can be restrained. Further, when it is predicted that the EGR amount does not exceed the allowable value, the respective actuators are simultaneously operated. Therefore, the EGR amount does not become excessive, and the target EGR amount can be achieved at an early stage.

Incidentally, the estimation method of the change process of the EGR amount in the system of Embodiment 1, which is described above, is not limited to the estimation method described above, and may be replaced with other estimation methods.

Note that in the above described Embodiment 1, the WGV 34 corresponds to a "waste gate valve" in the aforementioned fourth invention, the EGR valve 30 corresponds to an "EGR valve" in the aforementioned fourth invention, and the throttle valve 44 corresponds to a "throttle" in the aforementioned fourth invention, respectively. Further, in this case, "estimating means" in the aforementioned third invention is realized by the ECU 50 executing the processing of the above-described step S110, "determining means" in the aforementioned third invention is realized by the ECU 50 executing the processing of the above described step S120, "actuator simultaneously controlling means" in the aforementioned third invention is realized by the ECU 50 executing the processing of the above-described step S120 and the processing of the above-described step S150, and "actuator sequentially controlling means" in the aforementioned first invention is realized by the ECU 50 executing the processing of the above-described step S140 and the processing of the above-described step S150, respectively.

REFERENCE SIGNS LIST

10 internal combustion engine
12 injector
16 intake passage
18 exhaust passage
20 intake valve
22 exhaust valve
24 turbo charger
24a turbine
24b compressor
26 external EGR passage
30 EGR valve
32 bypass passage
34 WGV (Waste Gate Valve)
36 catalyst
40 airflow meter
44 throttle valve
48 air pressure sensor
52 crank angle sensor
54 accelerator opening sensor
56 intake VVT (IN-VVT)
58 exhaust VVT (EX-VVT)

The invention claimed is:

1. An internal combustion engine, comprising:
a turbo charger having a turbine provided in an exhaust passage;
a waste gate valve capable of performing opening and closing control of a bypass passage that bypasses the turbine;
an EGR valve capable of performing opening and closing control of an EGR passage that connects the exhaust passage provided upstream of the turbine and an intake passage;
a plurality of actuators that include the waste gate valve, and
a controller programmed to:
set operation amounts of the plurality of actuators that include the waste gate valve, the EGR valve and a throttle valve provided in the intake passage, and influence an EGR amount, in response to a change of an operator request, wherein the operation amounts are related actuator positions;
estimate a time transition of the EGR amount in a case in which operations of the plurality of actuators are simultaneously started based on an EGR amount correlation value at each time point, in accordance with the set operation amounts of the plurality of actuators, wherein the EGR amount correlation value is calculated by multiplying a pressure difference value by an opening area of the EGR valve, wherein the pressure difference value is obtained by subtracting intake pressure from a back pressure corresponding to opening and closing conditions of the waste gate valve;
determine an establishment of a determination condition that the EGR amount becomes larger than an allowable value in the time transition;
when the determination condition is not established, simultaneously start the operation of the plurality of actuators; and
when the determination condition is established, start operations of one or more actuators decreasing the EGR amount included in the plurality of actuators, then after the operations of the one or more actuators are completed, start operations of the other actuators increasing the EGR amount included in the plurality of actuators.

2. A method of controlling an internal combustion engine, the internal combustion engine control apparatus including a turbo charger having a turbine provided in an exhaust passage; a waste gate valve capable of performing opening and closing control of a bypass passage that bypasses the turbine; and an EGR valve capable of performing opening and closing control of an EGR passage that connects the exhaust passage provided upstream of the turbine and an intake passage; the method comprising:
setting operation amounts of a plurality of actuators that include the waste gate valve, the EGR valve and a throttle valve provided in the intake passage, and influence an EGR amount, in response to a change of an operator request, wherein the operation amounts are related to actuator positions;
estimating a time transition of the EGR amount in a case in which operations of the plurality of actuators are simultaneously started based on an EGR amount correlation value at each time point, in accordance with the set operation amounts of the plurality of actuators, wherein the EGR amount correlation value is calculated by multiplying a pressure difference value by an opening area of the EGR valve, wherein the pressure difference value is obtained by subtracting intake pressure from a back pressure corresponding to opening and closing conditions of the waste gate valve;
determining an establishment of a determination condition that the EGR amount becomes larger than an allowable value in the time transition;
when the determination condition is established, simultaneously starting the operation of the plurality of actuators; and
when the determination condition is established, starting operations of one or more actuators decreasing the EGR amount included in the plurality of actuators, then after the operations of the one or more actuators are completed, starting operations of the other actuators increasing the EGR amount included in the plurality of actuators.

* * * * *